350-3.73 SR

XR 3,785,736

United State x 3049 W

Spitz et al.

[11] 3,785,736

[45] Jan. 15, 1974

[54] SMALL-SIZED OPTICAL CORRELATOR

[75] Inventors: Erich Spitz; Guy Bismuth, both of Paris, France

[73] Assignee: Thomson-CSF, Paris, France

[22] Filed: Jan. 13, 1972

[21] Appl. No.: 217,589

[30] Foreign Application Priority Data

Jan. 14, 1971 France .............................. 7101146

[52] U.S. Cl. ............. 356/71, 340/146.3 P, 350/3.5, 350/162 SF

[51] Int. Cl...... G06k 9/08, G02b 27/00, G06k 9/00

[58] Field of Search........................ 356/71; 350/3.5, 350/162 SF; 340/146.3 P

[56] References Cited

UNITED STATES PATENTS

| | | | |
|---|---|---|---|
| 3,483,513 | 12/1969 | Burckhardt et al. | 356/71 |
| 3,540,791 | 11/1970 | Caulfield et al. | 350/162 SF |
| 3,670,305 | 6/1972 | Maloney | 350/3.5 |
| 3,666,359 | 5/1972 | Lee | 356/71 |
| 3,387,163 | 6/1968 | Queisser | 331/94.5 |
| 3,622,988 | 11/1971 | Caulfield et al. | 350/3.5 |

*Primary Examiner*—Ronald L. Wibert
*Assistant Examiner*—V. P. McGraw
*Attorney*—John W. Malley et al.

[57] ABSTRACT

The present invention relates to double-diffraction optical correlators.

According to the invention there is provided a multi-channel optical correlator for shape recognition wherein the lenses and the filters are all constituted by patterns of fringes ; each channel is fed from a quasi-monochromatic and quasi-punctiform light source, which may be spatially incoherent.

7 Claims, 6 Drawing Figures

3785736
OR IN 356/71

SMALL-SIZED OPTICAL CORRELATOR

The invention relates to correlation systems capable of analysing an optical data carrier which contain predetermined shapes, this in order to identify one or more of said shapes.

The invention relates more particularly to double-diffraction correlator.

In conventional double-diffraction correlators, a convergent beam of coherent light is spatially modulated by an object of non-uniform transparency ; the illumination of the plane of convergence of the modulated beam corresponds to the Fourier spectrum of the object. By arranging in this plane an optical filter constituted by the Fourier hologram of a specific element, a modified spectrum can be obtained ; by arranging for the reconvergence of the light emerging from said filter, there can be observed in the second plane of convergence, a light signal which is characteristic of the presence of said specific element in the object. Conventional correlators employ a laser as a source of coherent light as well as high-quality lenses of small numerical aperture, to form the first and second convergent beams ; these are of course expensive and bulky devices.

The object of the present invention is to replace the conventional lenses by less expensive lenses of much smaller diameter, in order at small cost to produce a multi-channel miniaturised optical correlator.

This objective is achieved by reducing the lateral and longitudinal size of each correlator cell and by making use of quasi-monochromatic, substantially point light sources which are not however spatially coherent.

According to the invention there is provided : a double diffraction optical correlator including at least one correlation channel having an input and an output for delivering a signal indication of the presence of at least one predetermined shape in an optical information support, said correlator comprising : an emission device supplying optical radiation to said channel input, a holographic converging lens associated with said channel, a filtering plane positioned across said channel, diffracting means pertaining to said channel and embodying a pattern of interference fringes relative to said shape, and radiation detection means optically coupled to said channel output ; said information support being illuminated by said emissive device ; said lens concentrating said optical radiation within said filtering plane ; said pattern of fringes lying within said filtering plane, for diffracting said concentrated optical radiation ; said radiation detection means being positiond for supplying said signal in response to a fraction of the diffracted radiation emerging from said diffracting means.

Figure 1:
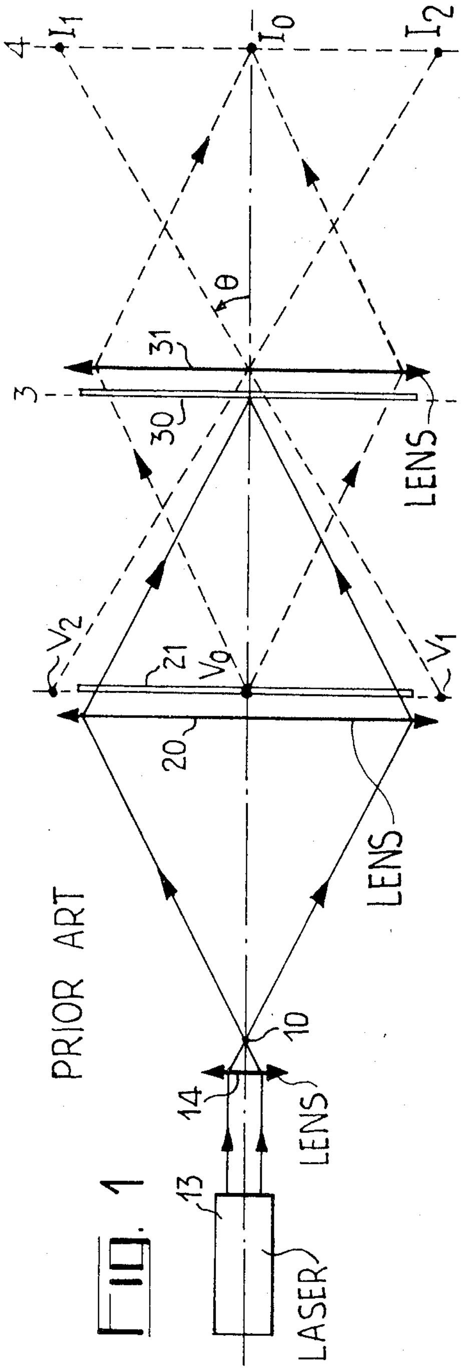
Figure 2:
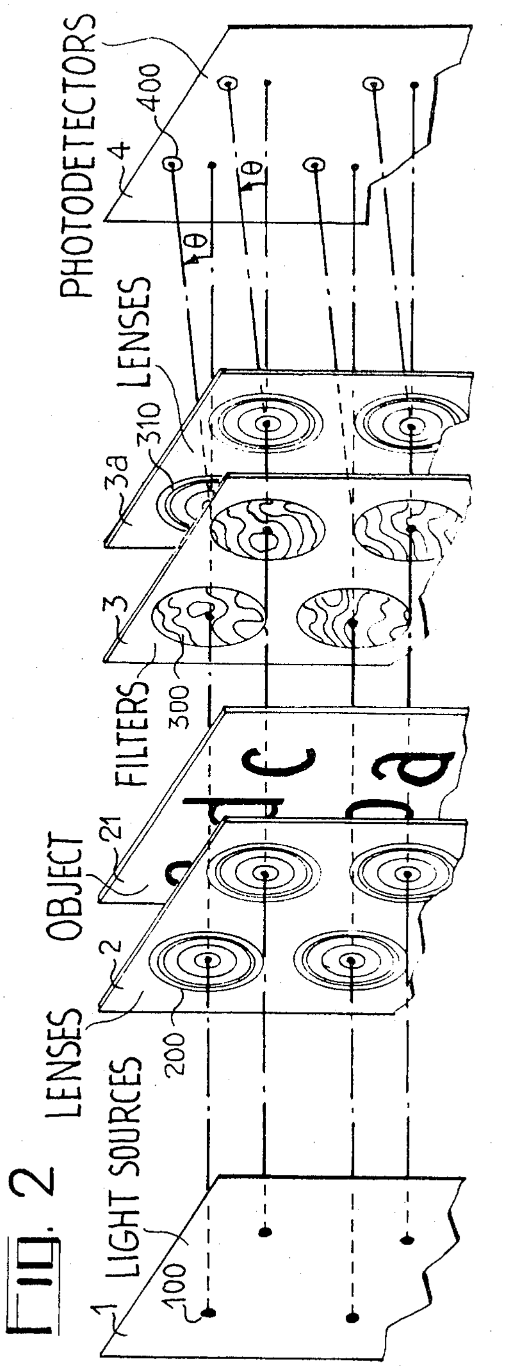
Figure 3:
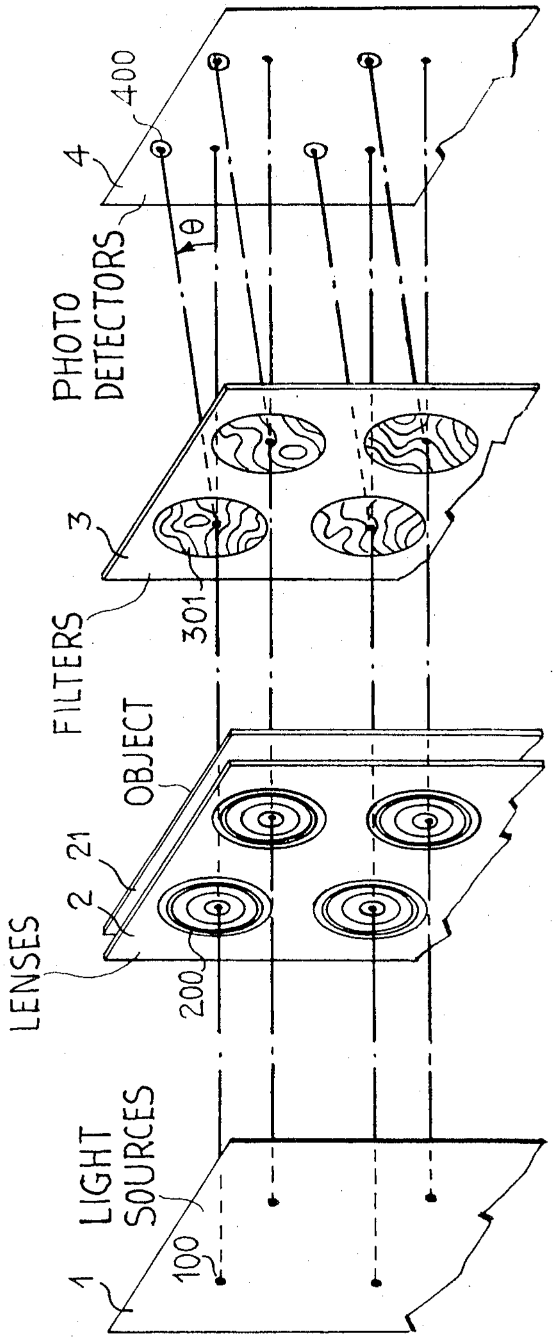
Figures 4A, 4B:
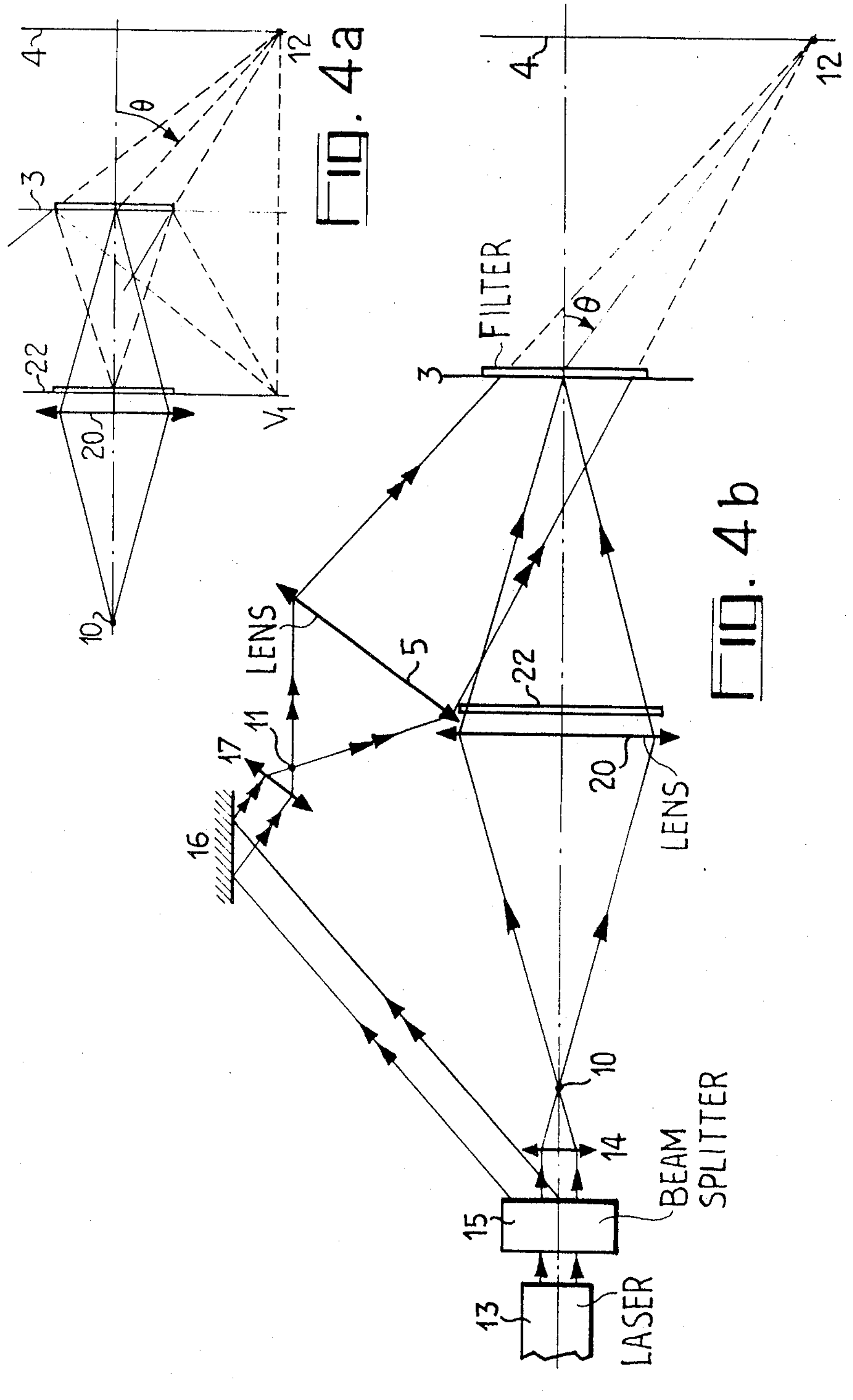
Figure 5:
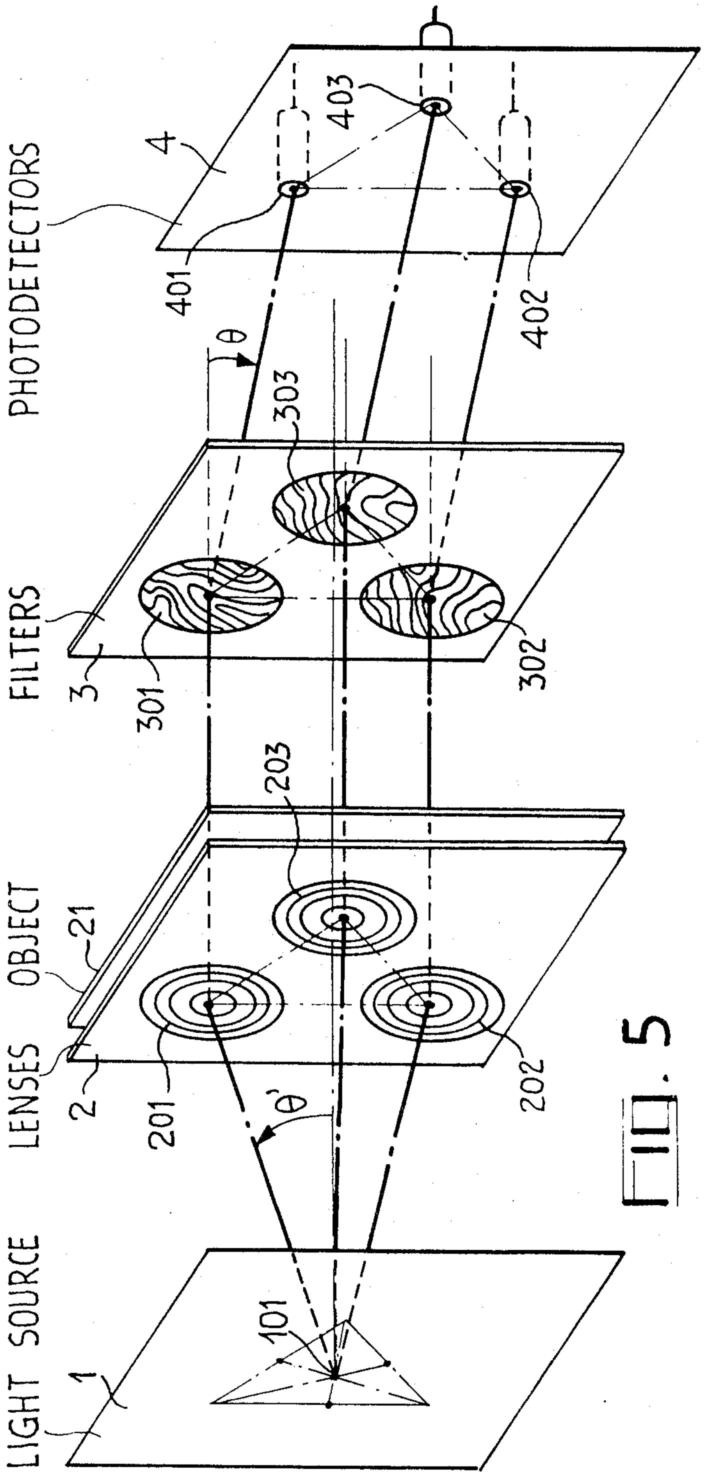

For a better understanding of the invention, and to show how the same may be carried into effect, reference will be made to the drawings accompanying the ensuing description and in which :

FIG. 1 schematically illustrates a known kind of double-diffraction correlator ;

FIG. 2 schematically illustrates a first embodiment of the optical correlator in accordance with the invention ;

FIG. 3 illustrates a first variant embodiment of the device in FIG. 2 ;

FIGS. 4*a* and 4*b* illustrate a device for constructing optical filters which can be utilised in the device of FIG. 3 ;

FIG. 5 illustrates a second variant embodiment of the optical correlator in accordance with the invention.

FIG. 1 shows the fundamental diagram of a known type of double-diffraction optical correlator. It comprises a coherent light source 13 associated with a lens 14 to produce a divergent light beam ensuing from the point source 10 which is the focus of the objective lens 14. This light beam is received by a first diffraction system 20, 21 comprising a spectrum-generating lens 20 which forms the image of the source 10 in a filtering plane 3, and an optical data carrier 21 constituting the object which is being examined and which spatially modulates the complex amplitudes of the light beam; the modulating carrier is for example a photographic plate which reproduces a printed text. In the filtering plane 3, a pattern of fringes constituting the spatial Fourier transform of the object being examined, is produced. The second diffraction means 30, 31 are located in the neighbourhood of this plane.

The filter 30 constituted by a plate of non-uniform transparency arranged in the filtering plane 3, is characteristic of a shape which is to be identified in the object 21 ; this shape may be constituted by one or more characters which may be contained in the text, and the filter may be the Fourier hologram of this shape ; the reproduction lense 31 projects the image of the carrier 21 into the detection plane 4. Photoelectric detectors, not shown in FIG. 1, can be arranged behind the plane 4.

In order to construct a Fourier hologram which can be used as a filter 30, the optical data carrier 21 behind the lens 20 can be replaced by a similar carrier representing the shape which it is desired to identify in the object, and the Fourier spectrum of said shape, which is projected into plane 3, can be caused to interfere with a coherent spherical reference wave issuing from the same laser 13 and centred at a point $V_1$ located in the plane of the carrier 21. An unexposed photographic emulsion arranged in the plane 3 makes it possible to record the Fourier hologram which, after processing, then constitutes the filter 30.

When the filter 30 is introduced into the correlator device shown in FIG. 1, it produces three virtual diffracted images of the object 21, in the plane of 21, the first of which images is centred on the point $V_0$ and therefore coincides with the object itself, the second on the point $V_1$ and the third on the point $V_2$ which is symmetrically disposed vis-a-vis $V_1$ in relation $V_0$; from these three virtual images, the lens 31 produces three real images in the detection plane, which are centred at the points $I_0$, $I_1$, $I_2$, these respectively being images of $V_0$, $V_1$, $V_2$. The image centred at $I_0$ is the direct image of the object and is virtually unmodified by the filter. The image centred at $I_1$ and deflected through an angle $\theta$ from the optical axis, contains the desired correlation signals in the form of as many light spots standing out against a black background, as there are shapes in the object which coincide with the shape it is desired to identify.

The quality of the correlation signals is essentially linked with the absence of abberations in the optical systems of the correlator and in the filter construction device. The lenses 20 and 31 must therefore not only have a very small numerical aperture but must furthermore be very carefully corrected which technically imposes a minimum dimension on the pupils. The lateral and longitudinal dimensions of the assembly shown in FIG. 1 are therefore substantial. The dimension of the input pupil furthermore dictates that the source 10 be coherent since it cannot be situated sufficiently far away.

In FIG. 2, an example of the double-diffraction optical correlator in accordance with the invention is to be seen. It is made up of a set of quasi-point and quasi-monochromatic sources 100 located in a plane 1. The first diffraction means receives light emerging from the source 100 ; these means comprise a set of convergent holographic lenses 200 located on a carrier 2, and an optical data carrier 21. The light emerging from the first diffraction means 2, 21, is collected by second diffraction means which comprise a set of filters 300 arranged upon a carrier placed in the filtering plane 3, and a set of convergent holographic lenses 310 arranged on a carrier 3*a*. Each lens 310 furnishes a correlation signal which is picked up by a photo-detector 400, the set of photodetectors 400 being arranged in a plane 4. The planes 1, 2, 21, 3, 3*a* and 4 are parallel, the planes 1 and 3, 21 and 4 being the respective anti-nodal planes of the lens sets 200 and 310 ; the planes 2 and 21 are close to one another ; the same therefore applies to the planes 3 and 3a. Associated with each source 100 there are two lenses 200 and 310, a filter 300 and a detector 400 to form a correlation channel ; the source, the two lenses and the filter are centred on one and the same optical axis at rightangles to the said planes. A detector is located on an axis which, at the exit of the lens 310, makes an angle of $\theta$ with the optical axis ; the value $\theta$ is characteristic of the process of construction of the filter.

To facilitate understanding, in FIG. 2 the same arrangement of optical elements has been adopted as in the conventional correlator described in FIG. 1. However, this example is in no way limitative of the scope of the invention and the latter in fact applies to any double-diffraction correlator assembly. The holographic lenses, which replace the objective lenses of conventional optical correlators, can have very small pupil diameters in the order of one millimeter for example, thus reducing the dimensions of the correlator in a linear ratio between 20 and 40, and creating the possibility of arranging a large number of correlation channels in parallel. One and the same set of holographic lenses 200 or 310 can be printed on the same carrier plate, and this considerably reduces the overall cost of the optical system. Using a light source which is not time-coherent but simply quasi-monochromatic and of sufficiently small emissive area to comply with the spatial coherence relationships, the small size of the pupil furthermore makes it possible to obtain an effective interference pattern in the filtering plane 3, whilst ammowing the lenses to retain a numerical operture in the same order as that of the objective lenses of conventional correlatirs. Sources of this kind can be substantizlly smaller and less expensive than laser sources. Still by way of non-limitative example, the device of FIG. 2 could operate using holographic lenses 200 and 310 of 1 mm diameter, and could use as the sources 100, gallium arsenide emissive diodes with an emissive area diameter in the order of $20/\mu$, emitting light centred on a spectrum line of 9,000 A and having a width of around 300 A at half amplitude.

A first improvement in the aforesaid device in accordance with the invention, is described in FIG. 3. The sources 100 in the plane 1 can be seen, the first diffraction means comprising the lenses 200 on the carrier 2 and the optical data carrier 21 as well as the detectors 400 in the detection plane 4, all these being elements which are already encountered in the device of FIG. 2. By contrast, the particular double-diffraction correlator device described in FIG. 1 has been modified by arranging in the filtering plane of the lenses 200, a single carrier 3 on which the combination of elements constituting the second diffraction means are replaced by holographic filters 301. These filters, the production of which will be described hereinafter, have the property of producing the correlation signal not in the form of a divergent beam emanating from a point located in the plane of the object 21, but in the form of a beam which, whithout the intervention of any optical system, converges directly on the detector 400 in the detection plane 4.

In the device of FIG.2, since each holographic filter produces three diffracted beams and each holographic lens three diffracted beams from each incident beam, the light energy arriving in the filtering plane is accordingly distributed over nine images in the detection plane. In FIG.3, a central holographic filter performs a function here previously separately assigned to the filters and lenses, so that the number of beams arriving at the diffraction plane is divided by three. The thus constituted device therefore has the advantage not only of greater simplicity of design but also of a much higher luminous efficiency.

FIG.4 illustrates a device in accordance with the invention by means of which it is possible to produce the aforedescribed filters utilising the correlator device of FIG. 3. Whereas the filters utilised in the arrangements of FIG. 1 and 2 were obtained by using a spherical reference wave centred on a point $V_1$ located in the plane 21 of the object, the construction device in accordance with the invention as illustrated by the diagram of FIG. 4a, utilises a coherent spherical reference wave centred on the point 12 in the detection plane 4. The optical data carrier 22 represents the shape which it is desired to identify in the object ; it is located in the neighbourhood of the exit pupil of the exit pupil of the lens 20 illuminated by the point source 10. The wave issuing from 10 and that centred on 12, are derived from the same laser beam. A phogotraphic plate arranged in the filtering plane 3 which latter is symmetrically disposed vis-a-vis the source 10 in relation to the lens 20, records the Fourier hologram produced by the interference between the two beams ; the filter of plane 3 is located between the planes 22 and 4, preferentially midway between the two.

The holographic filter thus constituted, when introduced into the correlator of FIG. 3 gives rise to three diffracted beams; a first divergent beam emanating from the virtual image of the object plane 21, a second divergent beam which is of no interest here, and a third beam convergent onto a plane 4 making the same mean angle $\theta$ with the optical axis of the channel as the reference beam, and also carrying the correlation signal.

FIG. 4b describes by way of non-limitative example a filter construction device the principle of which is described through FIG. 4a. A conventional arrangement constituted by a laser 13, a beam-splitter 15, a flat mirror 16 and two lenses 14 and 17, produces from one and the same laser beam two point sources 10 and 11 of coherent light, having the desired intensity ratio. The source 10 illuminates the analyser lens 20 which produces in the filtering plane 3 the Fourier transform of the optical data carrier 22. The source 11, across the lens 5, supplies the spherical reference wave which converges at 12 in plane 4 ; the optical axes of the lenses 20 and 5 sustend an angle of $\theta$ between one another. The filtering plane 3 where the photographic plate for recording the hologram is located, is midway between the planes 22 and 4.

In FIG. 5, a second variant embodiment of a correlator in accordance with the invention can be seen. This device exploits the property in accordance with which non-coherent sources emit through a very wide angle. Since a holographic lens can ensure stigmatic correspondence between two points located on a straight line not passing through its centre, one and the same non-coherent but quasi-monochromatic and quasi-punctiform light source can be used to supply radiant energy to several parallel correlation channels. By way of non-limitative example, FIG. 5 illustrates such a single source 101 which may be an emissive diode simultaneously supplying three parallel channels of a multi-channel correlator comprising first diffraction means in the form of three holographic lenses 201, 202, 203 arranged on a plate 2, and an optical data carrier 31, second diffraction means in the form of three holographic filters 301, 302, 303 arranged on one and the same plate in the filtering plane 3, and produced by the device hereinbefore described in relation to FIG. 4, and finally three radiation detectors 401, 402, 403, arranged in the detection plane 4. The planes 2, 21, 3 and 4 are parallel, 2 and 21 being very close to one another and 21, 3 and 4 being equidistant from one another. The filters 301, 302 and 303 correspond to different or identical shapes being identified, just as required; they produce correlation signals in a direction deflected by an angle $\theta$ in relation to their optical axis. The holographic lenses 201, 202 and 203 are three identical lenses designed in such a fashion that there is a conjugated relationship between a point on their optical axis and a point located upon an axis making an angle of $\theta'$ with said optical axis. The centres of the three lenses, the three filters and the three detectors, are the apices of equal and parallel equilateral triangles, the source 101 being projected at the orthocentre of said triangles ; the centres of the three lenses are thus located upon a cone of revolution whose apex half-angle is $\theta'$, the source 101 representing the apex.

It goes without saying that an arbitrary number $n$ of sources identical to 101 could be arranged in a plane 1 parallel to the plane 2, each of them being associated with an arbitrary number $p$ of correlation channels in order to provide a multi-channel correlator with $n \times p$ channels ; the holographic illuminating lenses can then be identical, provided that each group of $p$ lenses characterized by their deflection angle of $\theta'$, were arranged in the plane 2 of the intersection of the cone of half-angle $\theta'$ whose apex is defined by a source. It is possible, too, in order to increase the compactness of the assembly, to associate with one and the same source, $p_1$ holographic lenses of deflection angles $\theta'_1$, $\theta_2$, etc. etc.

By way of a non-limitative example of a possible application, four emissive diodes acting as sources can be associated with four groups of six correlation elements, thus providing 24 uniformly spaced channels in order to be able to simultaneously read 24 lines of a page of text and produce correlation signals every time a character recorded in the filter, appears in the text ; each lens will be dimensioned to cover a single line of the text. It is then merely necessary, in analysing a complete work, to records its successive pages on microfilm taking the precaution that lines of the same order on different pages are arranged on one and the same straight line parallel to the edge of the film, and to translate the film slowly through the correlator.

What we claim is:

1. Double diffraction optical correlator including at least one correlation channel having an input and an output for delivering a signal indicative of the presence of at least one predetermined shape in an optical information support said correlator comprising : an emissive device supplying optical radiation to said channel input, a holographic converging lens associated with said channel, a filtering plane positioned across said channel, diffracting means pertaining to said channel and embodying a pattern of interference fringes relative to said shape, and radiation detection means optically coupled to said channel output ; said information support being illuminated by said emissive device ; said lens concentrating said optical radiation within said filtering plane ; said pattern of fringes lying within said filtering plane, for diffracting said concentrated optical radiation ; said radiation detection means being positioned for supplying said signal in response to a fraction of the diffracted radiation emerging from said diffracting means.

2. Double diffraction optical correlator as claimed in claim 1, wherein said pattern of interference fringes is a -Fourier transform-holographic filter ; said diffracting means comprising, associated with said filter, a converging holographic lens ; said filter and said lens being positioned in parallel planes and conjointly ensuring convergence of said fraction of the diffracted radiation onto said radiation detection means.

3. Double diffraction optical correlator as claimed in claim 1, wherein said pattern of interference fringes is a -Fourier transform-holographic filter ; said filter ensuring convergence of said fraction of the diffracted radiation onto said radiation detection means.

4. Double diffraction optical correlator as claimed in claim 1, wherein said emissive device comprises at least one quasi-monochromatic and quasi-punctual source.

5. Double diffraction optical correlator as claimed in claim 1, wherein said emissive device comprises at least one radiation source ; each said source being associated with at least one said correlation channel.

6. Double diffraction optical correlator as claimed in claim 4, wherein said quasi-monochromatic and quasi-punctual source is a photo-emissive semiconductor element.

7. Double diffraction optical correlator as claimed in claim 1, wherein said pattern of interference fringes is a Fourier transform holographic filter ; said filter being constructed for respectively insuring convergence of said fraction of the diffracted radiation onto said radiation detection means upon receiving from said information support said optical-radiation modulated by said predetermined shape.

* * * * *